US009998420B2

(12) United States Patent
Jimenez Pazmino et al.

(10) Patent No.: US 9,998,420 B2
(45) Date of Patent: Jun. 12, 2018

(54) LIVE EVENTS ATTENDANCE SMART TRANSPORTATION AND PLANNING

(71) Applicant: International Business Machines Corporation, Armonk, NY (US)

(72) Inventors: Priscilla Fernanda Jimenez Pazmino, Chicago, IL (US); Dulce B. Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 14/959,085

(22) Filed: Dec. 4, 2015

(65) Prior Publication Data

US 2017/0163591 A1 Jun. 8, 2017

(51) Int. Cl.
  *H04L 12/58* (2006.01)
  *H04L 29/08* (2006.01)

(52) U.S. Cl.
  CPC .............. *H04L 51/32* (2013.01); *H04L 67/18* (2013.01)

(58) Field of Classification Search
  CPC .......... G06Q 50/01; H04L 51/32; H04L 67/18
  See application file for complete search history.

(56) References Cited

U.S. PATENT DOCUMENTS

| 8,676,937 B2 | 3/2014 | Rapaport et al. | |
| 2012/0239289 A1* | 9/2012 | Gontmakher | G08G 1/127 701/420 |
| 2012/0290652 A1* | 11/2012 | Boskovic | G06Q 10/02 709/204 |
| 2013/0080922 A1* | 3/2013 | Elias | G06Q 50/01 715/753 |
| 2013/0179440 A1 | 7/2013 | Gordon | |
| 2014/0082069 A1* | 3/2014 | Varoglu | G06Q 50/01 709/204 |

(Continued)

FOREIGN PATENT DOCUMENTS

WO       0137113 A2    5/2001

OTHER PUBLICATIONS

Disclosed Anonymously, "System for User Specified Rules and Calendar Integration to Control Automated Response to Social Networking Event Invitations," IP.com No. IPCOM000208296D, IP.com Electronic Publication: Jun. 29, 2011, pp. 1-7.

(Continued)

*Primary Examiner* — Jeong S Park
(74) *Attorney, Agent, or Firm* — Samuel A. Waldbaum

(57) ABSTRACT

Live events attendance smart transportation and planning. A social media profile and a social media friends list corresponding to the user is retrieved by the event service. The event service generates and transmits an event recommendation list to the user. The event service receives the ticket confirmation of the user obtaining a ticket to an event and receives a user transportation preference to attend the event. The event service retrieves a transportation preference for a friend from the social media friends list who obtained the admissions ticket to the event and generates a transportation recommendation to the event for the user and the friend from the social media friends list based on each of their transportation preferences for the event. The event service transmits the transportation recommendation to the user and the friend from the social media friends list.

3 Claims, 10 Drawing Sheets

(56) References Cited

U.S. PATENT DOCUMENTS

| | | |
|---|---|---|
| 2014/0156746 A1 | 6/2014 | Wheatley |
| 2015/0248651 A1* | 9/2015 | Akutagawa et al. |
| 2016/0026936 A1* | 1/2016 | Richardson ............ G06Q 10/02 |
| | | 705/5 |
| 2016/0132792 A1* | 5/2016 | Rosnow ................. G06Q 10/02 |
| | | 705/5 |
| 2016/0320195 A1* | 11/2016 | Liu .................... G01C 21/3438 |

OTHER PUBLICATIONS

Disclosed Anonymously, "Time-Limited Social Networks," IP.com No. IPCOM000230846D, IP.com Electronic Publication: Sep. 15, 2013, pp. 1-5.

Mell et al., "The NIST Definition of Cloud Computing," National Institute of Standards and Technology, U.S. Department of Commerce, Special Publication 800-145, Sep. 2011, pp. 1-7.

* cited by examiner

LIVE EVENTS ATTENDANCE SMART TRANSPORTATION AND PLANNING

BACKGROUND

The present invention relates generally to using social media to allow for group attendance to an event and for ridesharing to the event in order to bring more social and quantifiable benefits to participants and the environment respectively.

With the use of social media, such as, FACEBOOK, MYSPACE, TWITTER, etc., a user is able to indicate to his or her social media friends an event that the user is planning on attending or the user is able to see an event his or her social media friends are planning to attend. This may provide the opportunity for a group of friends to acquire tickets to the event and coordinate transportation if they desire to attend the event as a group.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for a group to attendance to an event. A user signs into to an event service. A social media profile and a social media friends list corresponding to the user is retrieved by the event service. The event service generates and transmits to a computing device of the user an event recommendation list of at least one event for which at least one friend from the social media friends list has obtained an admissions ticket. The event service receives the ticket confirmation of the user obtaining a ticket to the at least one event of the listed events from a ticket service provider and receives a user transportation preference to attend the at least one event. The event service retrieves a transportation preference for the at least one friend from the social media friends list who obtained the admissions ticket to the at least one event and generates a transportation recommendation to the at least one event for the user and the at least one friend from the social media friends list based on each of their transportation preferences for the event. The event service transmits the transportation recommendation to the user and the at least one friend from the social media friends list.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
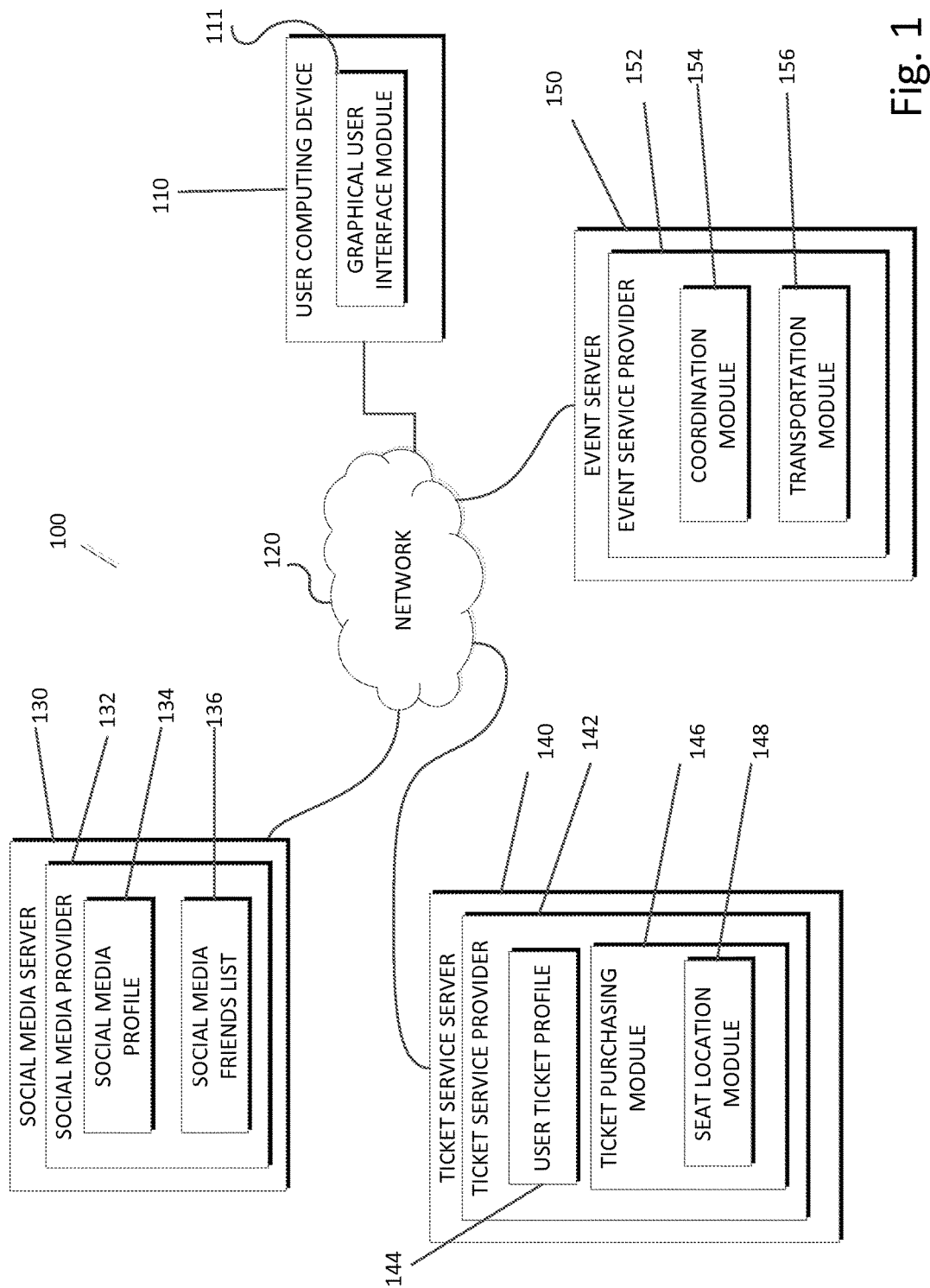
FIG. 1 is a functional block diagram illustrating a live events attendance smart transportation and planning system, in accordance with an embodiment of the invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will now be made in detail to the embodiments of the present invention, examples of which are illustrated in the accompanying drawings, wherein like reference numerals refer to like elements throughout.

Embodiments of the invention are general directed to a system for attending a live event as a group. In an exemplary embodiment, a user signs in to the event service, which is linked to the social media accounts of the user. Based on the user's social media history, prior ticket purchases through a ticket service, events that the user's social media friends have attended, and other entered and mined information about the user, the event service recommends events the user might be interested in attending. If a user purchases a ticket to an event, the event service may assist in coordinating transportation to the event for the user and the user's social media friends who have also purchased tickets to the event, based on the user's preferences and those of user's social media friends.

FIG. 1 is a functional block diagram illustrating a live events attendance smart transportation and planning system 100, in accordance with an embodiment. Live events attendance smart transportation and planning system 100 may include user computing device 110 and servers 130, 140, 150, all interconnected over network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between the user computing device 110 and servers 130, 140 and 150, in accordance with one or more embodiments of the invention.

A user computing device 110 represents a computing device that hosts a graphical user interface (GUI) that allows a user to communicate with social media server 130, ticket service server 140, and event server 150, each of which is described in more detail below. User computing device 110 may include GUI 111, which represents one or more user interfaces for sending and receiving information between user computing device 110 and servers 130, 140, and 150. GUI 111 may be, for example, a web browser, an application, or other types of GUIs for communication between user computing device 110 and servers 130, 140, and 150 via the network 120. GUI 111 allows for the user to access the user's social media accounts on social media server 130, to make ticket purchases via ticket service provider 142 on ticket service server 140, and to use the event service 152 on event server 150 to make transportation arrangements to the attend the event.

Figure 9:
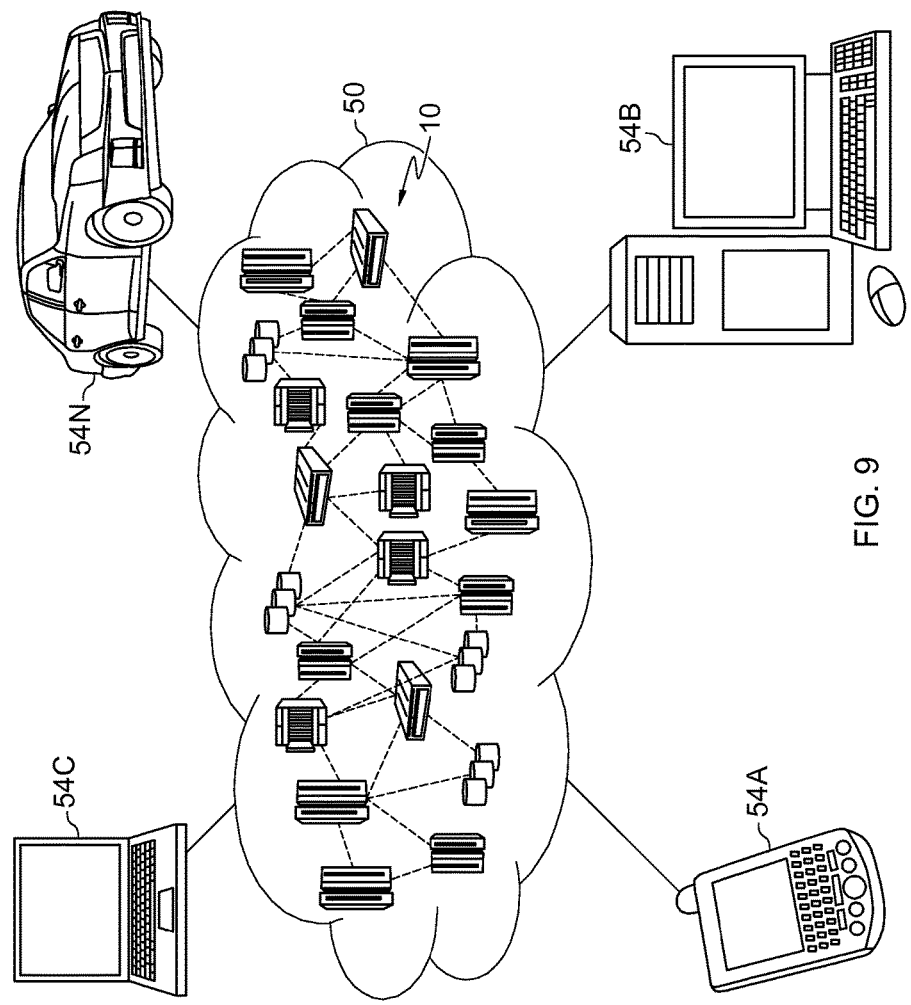
FIG. 9 depicts a cloud computing environment according to an embodiment of the present invention.
Figure 10:
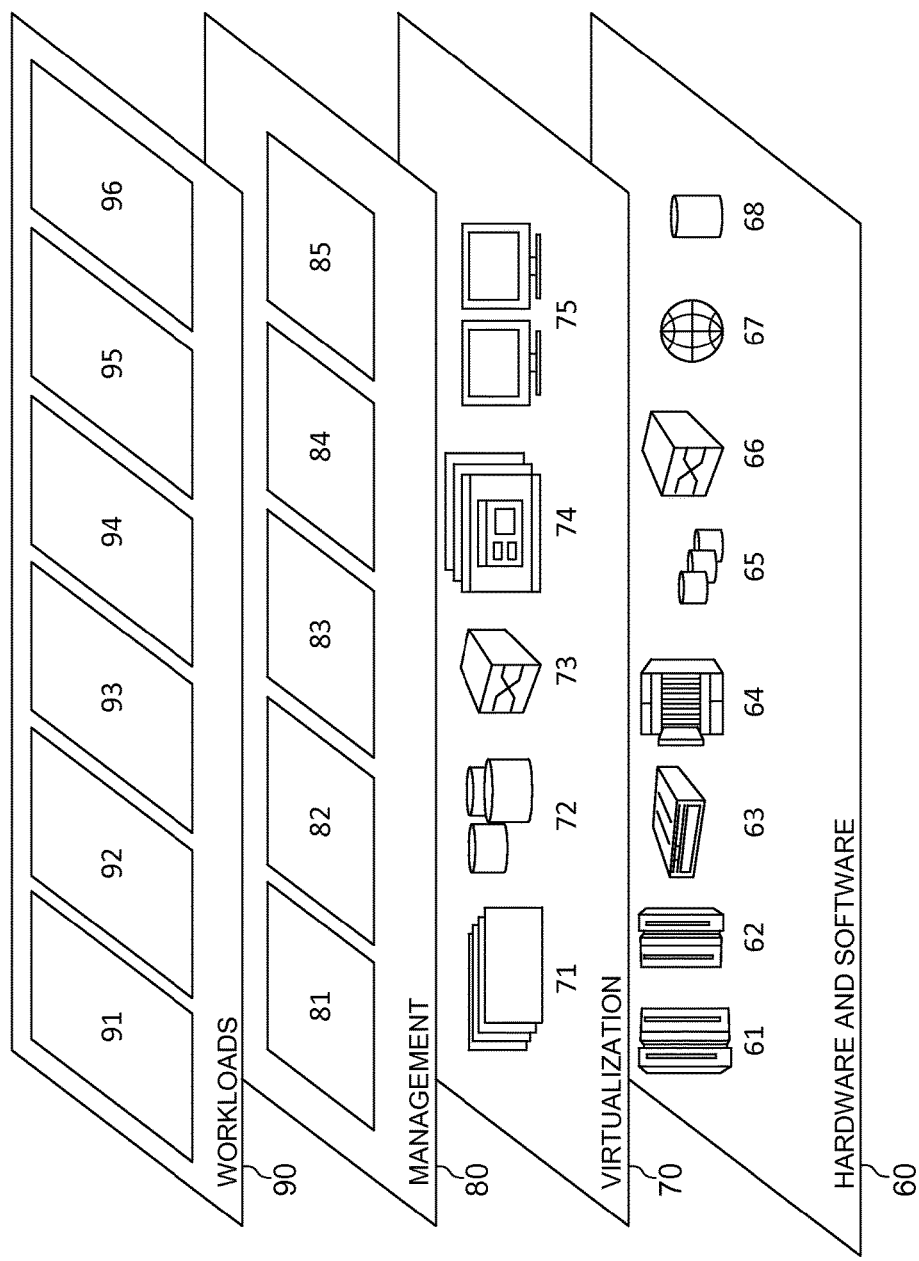
FIG. 10 depicts abstraction model layers according to an embodiment of the present invention.

The user computing device 110 may be any type of computing device that is capable of connecting to network 120, for example, a laptop computer, tablet computer, netbook computer, personal computer (PC), a desktop computer, a smart phone, or any programmable electronic device supporting the functionality required by one or more embodiments of the invention. The user computing device 110 may include internal and external hardware components, as depicted and described in further detail below with respect to FIG. 7. In other embodiments, user computing device 110 may include internal and external hardware components, as depicted and described in further detail below with respect to FIG. 8, and operate in a cloud computing environment, as depicted in FIGS. 9 and 10.

Social media server 130 represents one or more network platforms that host one or more social media network-based applications to which the user subscribes. Social media server 130 may include social media provider 132, which represents the one or more social media network-based applications to which the user subscribes. For ease of explanation, social media server 130 and social media provider 132 will be described in the context of a single social media server 130 hosting a single social media provider 132, to which the user subscribes. Social media server 130 may include internal and external hardware components, as depicted and described in further detail below with reference to FIG. 6. In other embodiments, social media server 130 may include internal and external hardware components, as depicted and described in further detail below with respect to FIG. 8, and operate in a cloud computing environment, as depicted in FIGS. 9 and 10.

Social media provider 132 includes social media profile 134 and social media friends list 136. The social media profile 134 is a datastore that is maintained by social media provider 132, and contains information about the user, for example, storing and tracking the historical data of the user (for example, previous user posts), tracking things that the user has indicated an interest in, tracking events that the user has indicated that he attended, and a geographical home and work location of the user. The social media profile 134 is further a data store, for the above mentioned data, for each of the friends listed on the social media friends list 136.

The social media friends list 136 contains the identifiers of "friends," or other users of the social media provider 132, to which the user has "friended," or agreed to share information within the context of the social media provider. Those of skill in the art will recognize that various social media providers may use different terminology for such friends and the act of friending.

In an exemplary embodiment, the social media provider 132 may communicate with other network based applications, for example, ticket service provider 142 and event service 152, which are described in more detail below, to provide them access to user information controlled by the social media provider 132.

Ticket service server 140 represents one or more network platforms that host one or more network-based ticket purchasing applications. Ticket service server 140 may include a ticket service provider 142 which represents the one or more ticket purchasing applications to which the user subscribes. Ticket service server 140 may include internal and external hardware components, as depicted and described in further detail below with reference to FIG. 6. In other embodiments, ticket service server 140 may include internal and external hardware components, as depicted and described in further detail below with respect to FIG. 8, and operate in a cloud computing environment, as depicted in FIGS. 9 and 10.

Ticket service provider 142 may include a user ticket profile 144, and a ticket purchasing module 146, which may further include a seat location module 148. The ticket service provider 142 receives an event recommendation list from the event service 152, which will be explained in further detail below, and the ticket purchasing module 146 analyzes the event recommendation list to determine which events still have tickets available and confirms that the friends listed on the event recommendation list have indeed already obtained a ticket to at least one of the listed events.

The user ticket profile 144 is a data store that is maintained by the ticket service provider 142 and contains information about the user and the user's social media friends if they have previously used the ticket service provider 142 to obtain a ticket to an event, for example, storing and tracking the historical ticket purchase data of the user. Ticket purchasing module 146 may use the data stored in the user ticket profile 144 to recommend events that the user might be interested in attending based on his/her historical ticket purchase data. Ticket purchasing module 146 may include the seat location module 148, which determines the available seat locations to the event and determines the seat location of the friends that are attending the event. This allows the seat location module 148 to recommend seats to the user that are available to be purchased that are located in a close proximity to where the friends are seated. The user is able to purchase a ticket to attend the event through the ticket purchasing module 146 and the ticket purchasing module 146 sends out a confirmation to the user or a third party service, such as, the event service 152, when necessary, to confirm that the user has obtained at ticket.

In an exemplary embodiment, ticket service provider 142 may communicate with other network based applications, for example, social media provider 132, and event service 152, which is described in more detail below, to provide them access to user information controlled by ticket service provider 142.

Event server 150 represents one or more network platforms that host a network-based event attendance application, in accordance with one or more embodiments of the invention. Event server 150 may include an event service provider 152. Event server 150 may include internal and external hardware components, as depicted and described in further detail below with reference to FIG. 6. In other embodiments, event server 150 may include internal and external hardware components, as depicted and described in further detail below with respect to FIG. 8, and operate in a cloud computing environment, as depicted in FIGS. 9 and 10.

Figure 2:
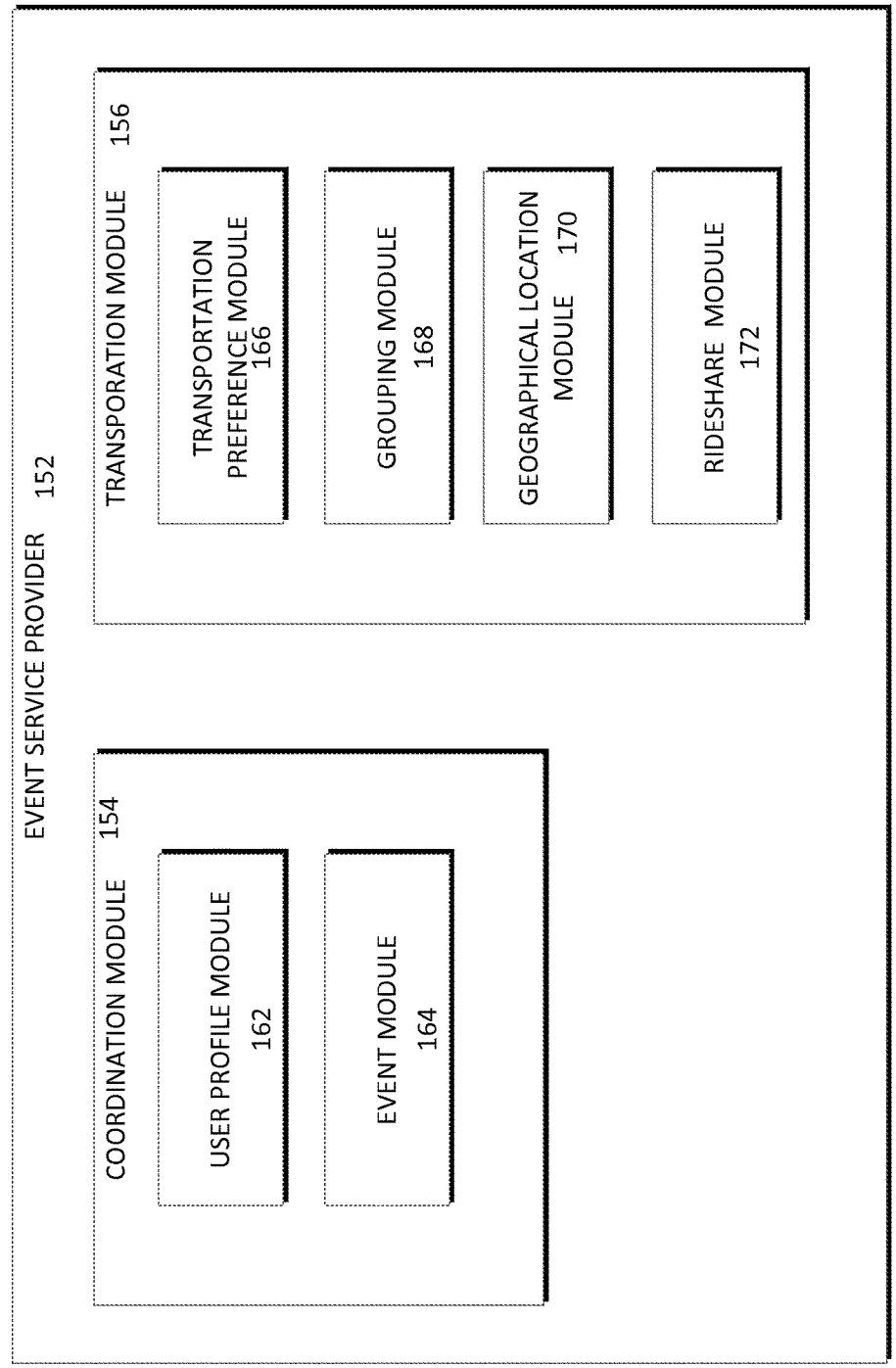
FIG. 2 is a function block diagram illustrating the events service program for the live events attendance smart transportation and planning system, in accordance with an embodiment of the invention.

FIG. 2 is a function block diagram illustrating the event service provider 152 for the live events attendance smart transportation and planning system, in accordance with an embodiment of the invention. In various embodiments of the invention, event service provider 152 is a service that communicates with social media providers 132 to retrieve social media data in order to recommend events to a user that he can attend as a group with his friends. The event service provider 152 further communicates with a ticket service provider 142 to allow a user to obtain tickets to the event and the event service provider 152 may coordinate the transportation for the user and his friends to attend the event. The coordination module 154 allows the event service 152 to coordinate group attendance to an event, while the transportation module 156 allows for a group of friends to arrive to and leave the event together to create an enjoyable experience.

The event service provider 152 may include a coordination module 154 and a transportation module 156. The coordination module 154 represents one or more applications that coordinate group attendance to an event. The coordination module 154 may include a user profile module 162 and an event module 164.

In an exemplary embodiment, a user creates an account with the event service 152. The user inputs his/her social media accounts and transportation preference to attend the event in the GUI 111 of the user computing device 110. Each time a user signs into the event service 152, the user is provided an opportunity to update the social media providers 132 the user uses, i.e. the user is able to add or delete social media providers 132 that are associated with his/her user profile with the event service 152.

In an exemplary embodiment, each time the user logs into the event service 152 the user profile module 162 sends a request to the social media provider 132 for access to the user social media profile 134, social media friends list 136, and the user social media profiles 134 for each of the friends listed on the social media friends list 136. In other embodiments, the user profile module 162 may send the request to the social media provider 132 on a schedule instead of when the user logs into the event service 152. The user profile module 162 receives the requested information from the social media provider 132 and compiles the information contained within the social media profile 134, social media friends list 136, and the user social media profiles 134 for each of the friends listed on the social media friends list 136 to create a singular user profile for the user. The user profile module 162 can create the singular user profile using the received information from only one social media provider 132 or the singular user profile can be created from the information received from a plurality of different social media providers 132. The singular user profile contains the received social media data, for example, about the user preferences, user historical posts, the user geographical home location, past event attendance, friends list, event friends have attended, about the each of the friends preferences, each of the friends historical posts, geographical home location of social media friends or any data that is contained within the social media provider 132.

The event module 164 uses the created singular user profile to create an event recommendation list to send to the ticket service provider 142 and to the user computing device 110. As described above, the ticket service provider 142 may recommend events to the user that he might be interested in, however, the recommended events from the ticket service provider 142 are based on the previous events that the user has obtained a ticket to attend. In contrast, the event module 164 creates a recommendation list using all the data contained within the singular user profile instead of using only the user prior ticket purchase history.

The event recommendation list is composed of events that the user or the friends listed on the user's social media friends list might attend based on the information contained within the user profile. The recommended events are determined from the created singular profile, for example, event module 164 might consider what topics the user or his/her friends have expressed an interest in, what event each of them have previously attended, or current events the user or his/her friends are currently talking about in their social media profiles 134. The event recommendation list further contains events that friends listed on the social media friends list 136 have already obtained tickets to attend. The event module 164 transmits the event recommendation list to the ticket service provider 142 via network 120 and the user purchases the ticket to attend an event that is listed on the event recommendation list via GUI 111 on the user computing device 110. The event module 164 receives confirmation that the user has obtained a ticket to attend an event from the ticket service provider 142. When event module 164 receives a confirmation that the user has obtained a ticket to the event, the transportation module 156 may arrange transportation for the user to attend the event.

The transportation module 156 represents one or more applications that coordinate the transportation for a group to attend the event. The transportation module 156 operates generally to coordinate transportation to attend the event, so that the user and his/her friends can attend as a group. The transportation module 156 organizes the group transportation to the event by coordinating the user transportation preference and the transportation preference of his/her friends so that desired transportation to the event can be arranged. The transportation module 156 considers the geographical home location of the user and his/her friends, who the user previous shared a ride with and the user feedback on the previous rideshare, type of transportation that is available and what type they prefer, and generates a rideshare list to be transmitted to the user and his/her friends based on their preferences.

The transportation module 156 may include a transportation preference module 166, grouping module 168, geographical location module 170 and a rideshare module 172.

Transportation preference module 166 makes an initial determination as to how the user would like to travel to the event by retrieving the user stored transportation preference and retrieves any previous user feedback about prior rideshares. The transportation preference module 166 determines if the user would like to update his/her transportation preference each time the user obtains tickets to a new event. This allows the user to indicate different transportation preferences for different events the user is going to attend. The transportation preference module 166 determines if the user has a transportation preference of, for example, driving to the event, share rental automobile fees, take public transportation or take a party bus. The transportation preferences listed here are used as examples to show how a group might attend an event, and the transportation preference listed here are not an exclusive list and other transportation preference can be considered. One of ordinary skill in the art will recognize that any type of transportation that allows for group travel to an event may be a possible transportation preference. How the user preference is determined will be described in more detail below. The transportation preference module 166 retrieves transportation preferences for the friends attending the event that have an account with the event service 152.

The grouping module 168 may create an initial transportation list composed of the user and friends that prefer the same type of transportation to the event. The grouping module 168 further forms party bus group from a plurality of different initial transportation lists when the transportation preference module 166 determines that the transportation preference is a party bus. How the party bus group is formed will be further explained below.

Once the initial social media list is formed the geographical location module 170 determines the geographical home location of the user and the geographical home location of each friend in the social media friends list 136 that are included in the initial social media list. The geographical location module 170 allows for a central meet up location to be arranged based on the geographical home location of the user and each of the friends from the social media friends list 136 that has the same transportation preference. The geographical location module 170, further determines a general geographical location of each of the social media groups that want to travel by party bus, to insure that that the people riding the party bus have a home location in a close proximity, or centered around, to each other.

The rideshare module 172 receives the initial transportation list and generates a rideshare list based on the determination by the geographical location module 170. The rideshare module 172 generates a rideshare list and transmits it to the user and the friends that share the same transportation preference as the user. Based on the type of transportation desired, the rideshare module 172 transmits a rideshare list to a driver to allow for a carpool, transmits to the driver a list of people willing to share cost of renting an automobile. The rideshare module 172 further transmits to the user and friends willing to take public transportation a central meeting location, and transmits to each of the people contained within the party bus group the name of each of the party bus riders along with the party bus service information to attend the event.

Figure 3:
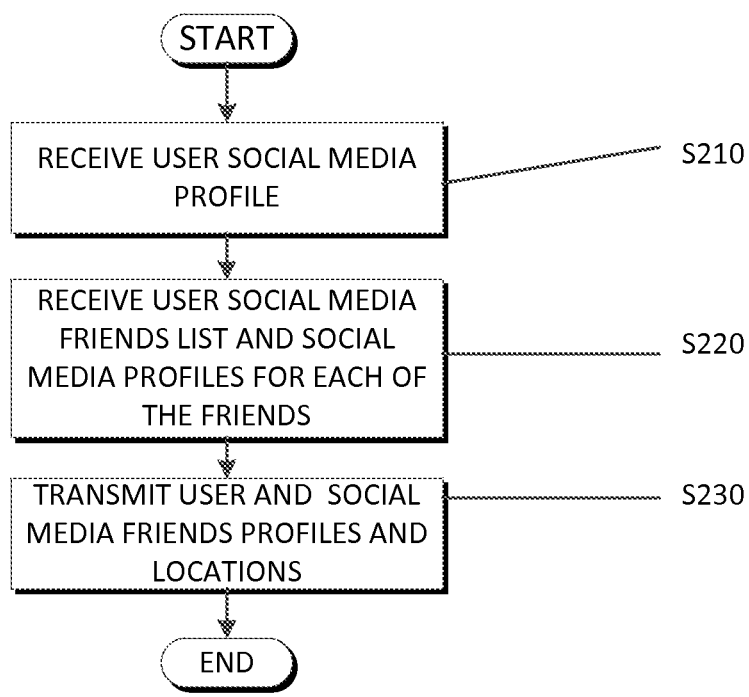
FIG. 3 is a flowchart depicting operational steps of the social media provider and it interactions with the event service program, in accordance with an embodiment.

FIG. 3 is a flowchart depicting operational steps of the social media provider 132 and its interactions with the event service provider 152, in accordance with an embodiment.

The social media provider 132 receives a request from the event service provider 152 for the user's social media profile 134 (S210), the user's social media friends list 136 and the social medial profile 134 for each of the friends listed on the social media friends list 136 (S220). As described above the user social media profile 134 is a data store that contains information about the user, for example, storing and tracking the historical data of the user (for example, previous user posts), tracking things that the user has indicated an interest in, tracking events that the user has indicated that he attended and a geographical home location of the user. The social media friends list 136 contains the names of friends, links to their accounts and allows access to the information contained within each of their accounts, for example, historical data of each of the friends (for example, previous posts), tracking things that the friends have indicated an interest in, tracking events that the friends have indicated that they have attended and a geographical home location of each of the friends. The social media provider 132 transmits the social media user profile 134 and the user social media friends list 136 to the event service 152 (S230).

Figure 4:
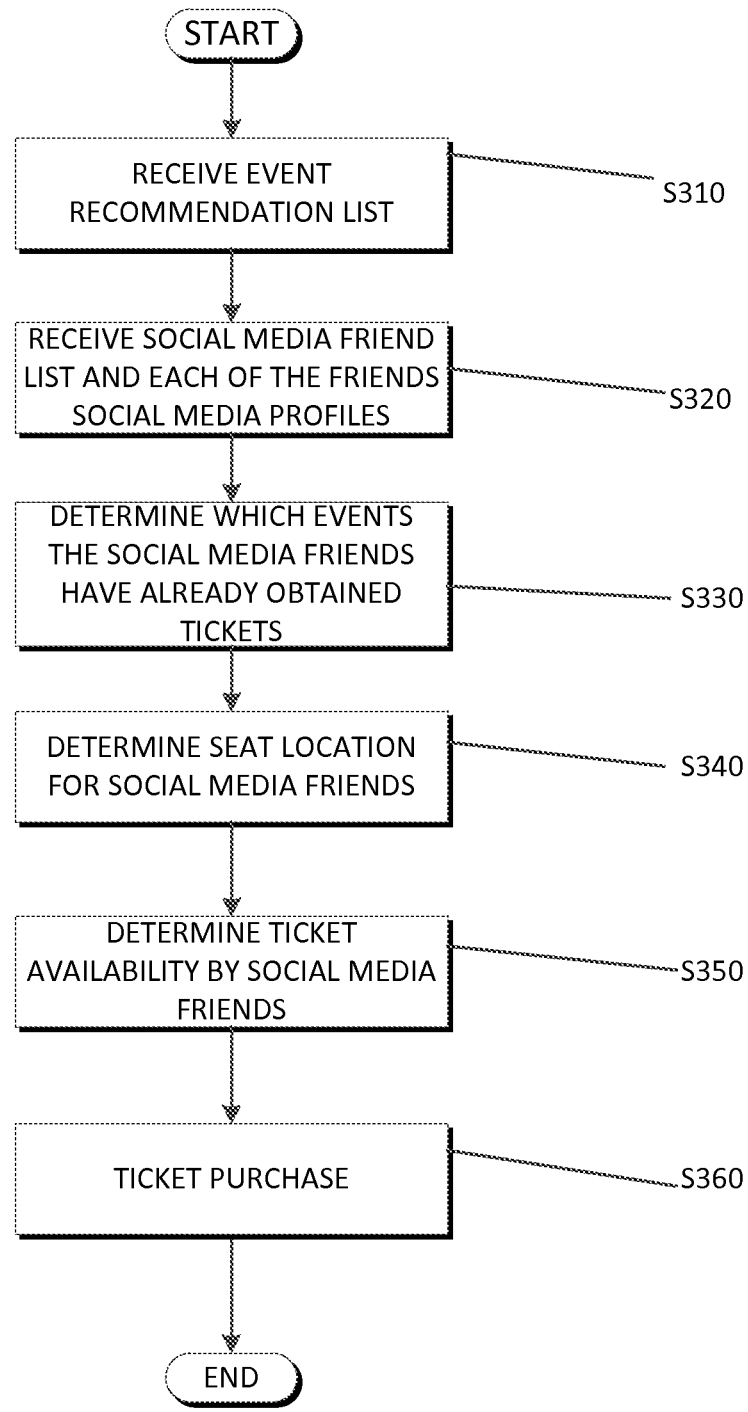
FIG. 4 is a flowchart depicting operational steps of a ticket service provider program, in accordance with an embodiment of the invention.

FIG. 4 is a flowchart depicting operational steps of a ticket service provider program, in accordance with an embodiment of the invention, from the perspective of the ticket service provider 142 on how the user obtains a ticket to an event. The ticket service provider 142 receives an event recommendation list from the event service 152 (S310) and receives the social media friends list 136 from the event service (S320). The ticket purchasing module 146 determines which events listed on the event recommendation list that at least one friend that is listed on the social media friends list 136 have obtained tickets and that tickets are still available for attendance to the event (S330). The seat location module 148 determines the seat location for each of the friends listed on social media friends list 136 that have obtained tickets to the event (S340). The ticket purchasing module 146 determines that tickets to the event are still available and the seat location module 148 determines where the seats for available tickets are located and recommends an available seat that has a location in close proximity to where the user friends listed on social media friends list 136 are seated (S350). When the user purchases a ticket to the event, though, for example, the GUI 111 on the user computing device 110, and the ticket service provider 142 transmits ticket purchase confirmation to the event service 152 (S360).

Figure 5:
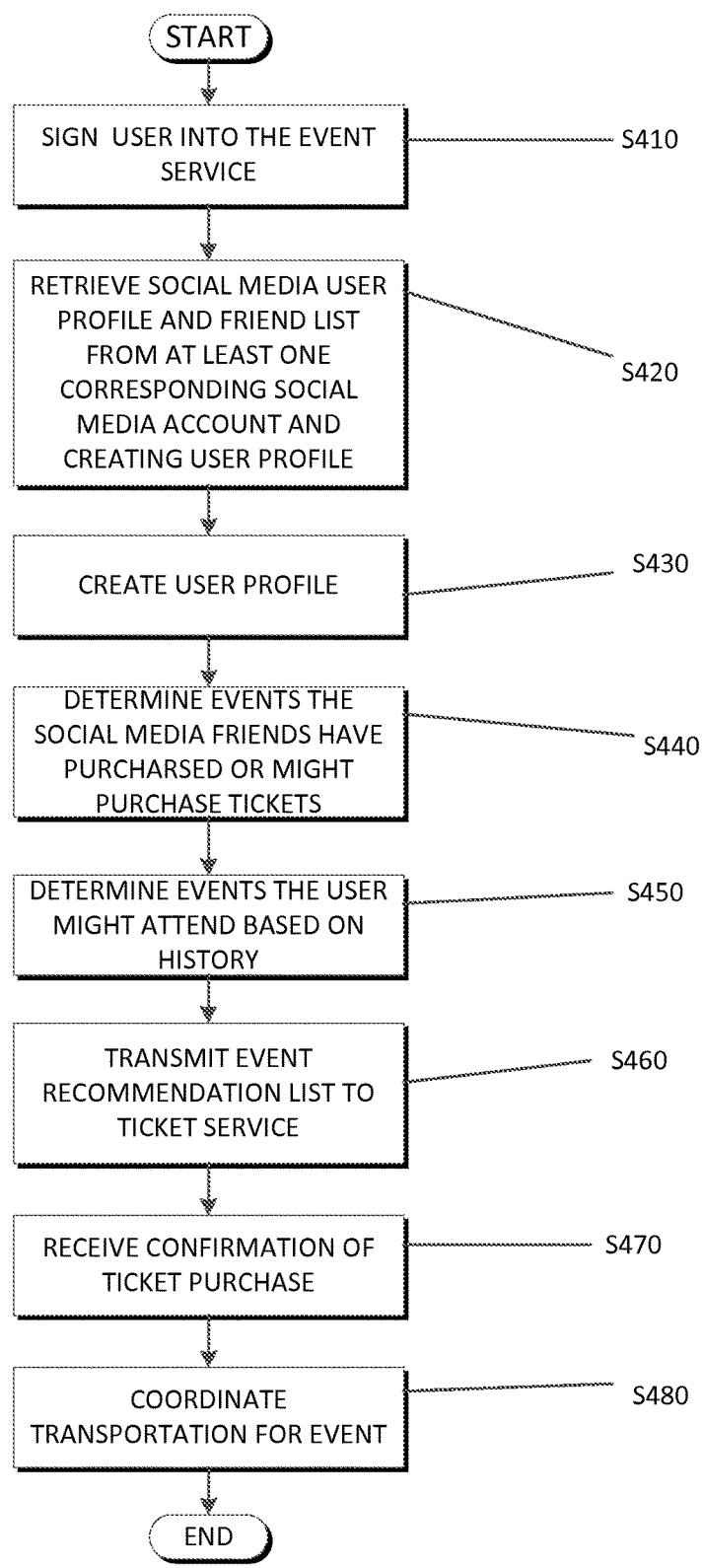
FIG. 5 is a flowchart depicting operational steps of another aspect of the event service program, in accordance with an embodiment of the invention.

FIG. 5 is a flowchart depicting the event service 152 interactions with the social media provider 132, ticket service provider 142 and arranging transportation to the event, as illustrated by FIG. 5, in accordance with an embodiment.

In response to the event service 152 receiving a user sign in request, the event service 152 allows the user to input at least one social media profile 134 (i.e., user name and password) and the event service 152 receives the corresponding the social media provider 132 (S410). The event service 152 sends a request to social media provider 132 and receives the at least one social media profile 134 and the user's social media friends list 136 from the social media provider 132 (S420). As described above, the user profile module 162 receives the data contained within the user social media profile 134 and the data contained within the social media friends list 136.

The user profile module 162 compiles a singular user profile using the information contained within the received social media profile 134 and the received social media friends list 136 (S430). The event module 164 determines if there are any upcoming events that the friends on social media friends list 136 have obtained tickets to attend (S440) and the event module 164 further determines any future event that the user or friends listed on the social media friends list 136 might obtain tickets for the event based on the compiled singular user profile (S450).

The event module 164 compiles an event recommendation list and transmits it to the ticket service provider 142 (S460). As described above, the ticket service provider 142 allows the user to obtain a ticket to event at a seat located close to a location where his friends are sitting, through the GUI 111 of the user computing device 110. The coordination module 154 receives confirmation of the ticket purchase from the ticket service provider 142 (S470). The transportation module 156 coordinates transportation for the user using the user transportation preference and the social media friends list transportation preference (S480), which will be described below.

Figure 6:
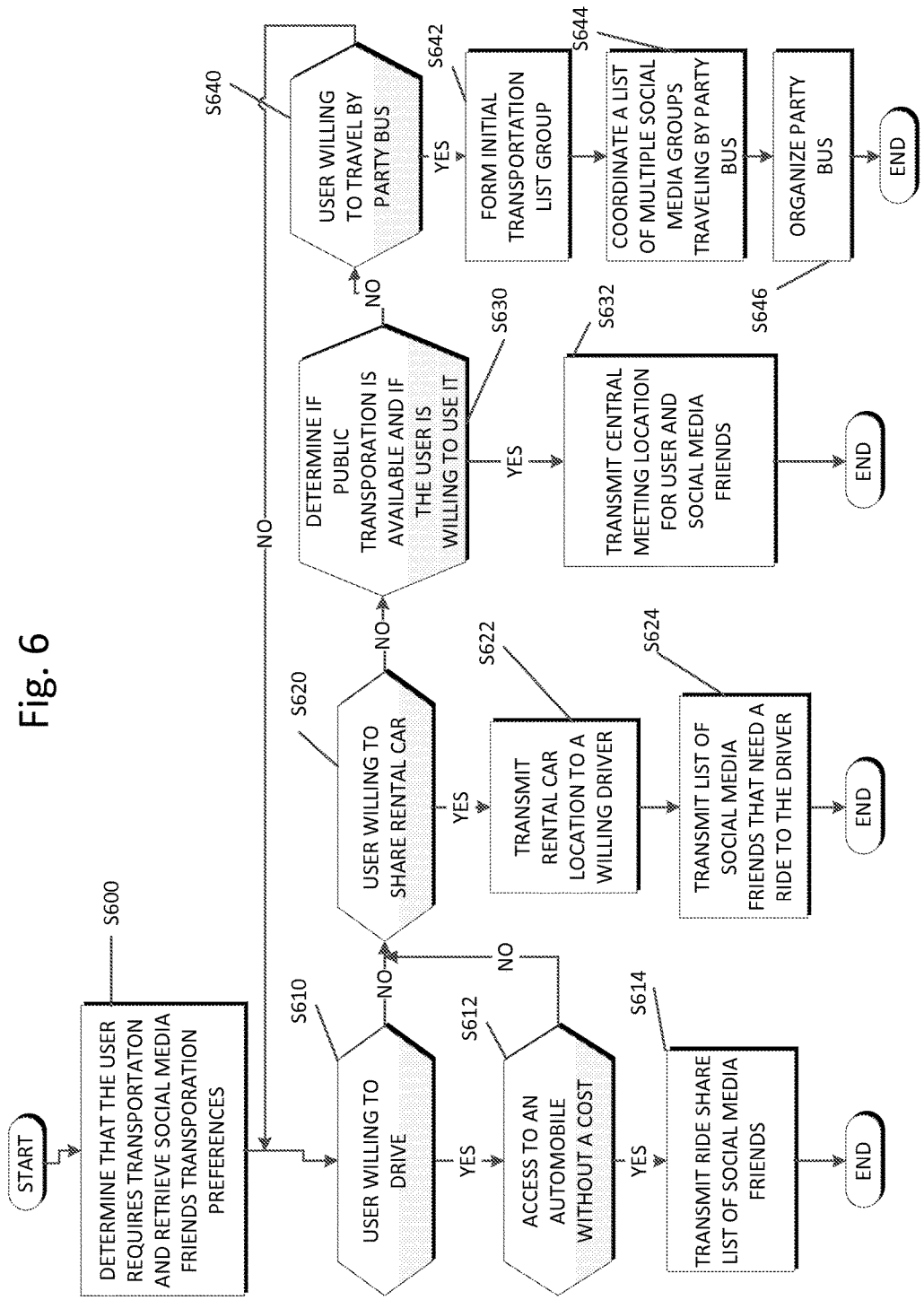
FIG. 6 is a flowchart depicting operational steps of transportation module of the event service program, in accordance with an embodiment of the invention.

FIG. 6 is a flowchart depicting the method of arranging transportation to the event for the user, in accordance with an embodiment.

The transportation preference module 166 determines if the user requires transportation to the event and retrieves each of the friends listed on the social media friends list 136 transportation preferences (S600). The user is able to specify a default transportation preference and/or is able to update the transportation preference each time the user has obtained tickets to a new event and retrieves any previous user feedback about prior rideshares. The transportation preference module 166 receives the user preference if he is willing to drive to the event (S610), and if he is not willing to drive the transportation preference modules proceeds to step S620. If the user is willing to drive to the event, the user indicates if he has access to automobile without a cost, i.e. not needing to rent an automobile, (S612). If the user does not have access to an automobile without a cost the transportation preference module 166 proceeds to step S620. If the user is willing to drive and has access to an automobile without a cost, the rideshare module 172 transmits a rideshare list to the user containing the social media friends in a close geographical location to his home geographical home location that require a ride to the event. In the alternative, which is not shown, the user does not have to be the driver of the automobile to the event and one of his friends listed on his social media friends list 136 can be the driver to the event. In this situation, the user's name is included in the rideshare list that the driver of the automobile receives for ridesharing to the event.

The transportation preference module 166 determines if the user is willing to share the cost of rental automobile if the user is unwilling to drive or if the user does not have access to an automobile and must rent one (S620). If the user is not willing to share the cost of rental automobile transportation preference module 166 proceeds to step S630. The grouping module 168 and the geographical location module 170 finds a rental automobile that has a location in a close proximity to the geographical home location of the user, if he is willing to drive or a friend from the social media friends list 136 if he is willing to drive and sends the rental automobile location to the willing driver (S622). The rideshare module 172 transmits the rideshare list to the person willing to drive the rental automobile. The rideshare list contains a list of friends in a close geographical location to the driver's geographical home location that require a ride to the event and that are willing share the rental automobile cost (S624).

The transportation preference module 166 determines if public transportation is available to attend the event, and if it is available it determines if the user is willing to take public transportation (S630). If the user is not willing to take public transportation or if public transportation is not an option to attend the event the transportation preference module 166 proceeds to S640. If the user is willing to use public transportation to attend the event the geographical location module 170 transmits a central meeting location to the user and to each of the friends from the social media friends list 136 that indicated that their transportation preference was public transportation (S632). The central meeting location is a geographical location that is centrally placed for using public transportation based on the user geographical home location and the geographical location for each of the friends.

The transportation preference module 166 determines if the user is willing to travel to the event by a party bus (S640). If the user is not willing to travel by party bus, then the transportation preference module 166 resets the transportation decision process and determines if the user is willing to drive (S610). If user is willing to travel by party bus to the event, then the grouping module 168 forms a social media group, such that, the social media group is formed from the user and friends listed on his social media friends list 136 that indicated that their transportation preference is a party bus (S642). The grouping module 168 coordinates a list of multiple social media groups, based on the geographical locations of each of the social media groups determined by the geographical location module 170, to organize the people riding the party bus (S644). The rideshare module 172 generates a rideshare list composed of a plurality of social media groups, by, for example, combining the social media groups, willing to ride the party bus to the event and transmit the information to each of the riders (S646). The rideshare module 172 also reservoir the party bus for the social media groups by interacting with a third party service that provides this service (S646). By organizing the party bus to the event which allows people attending an event to meet new people who have similar interest, while simultaneously attending with friends from his/her own social media friends.

Figure 7:
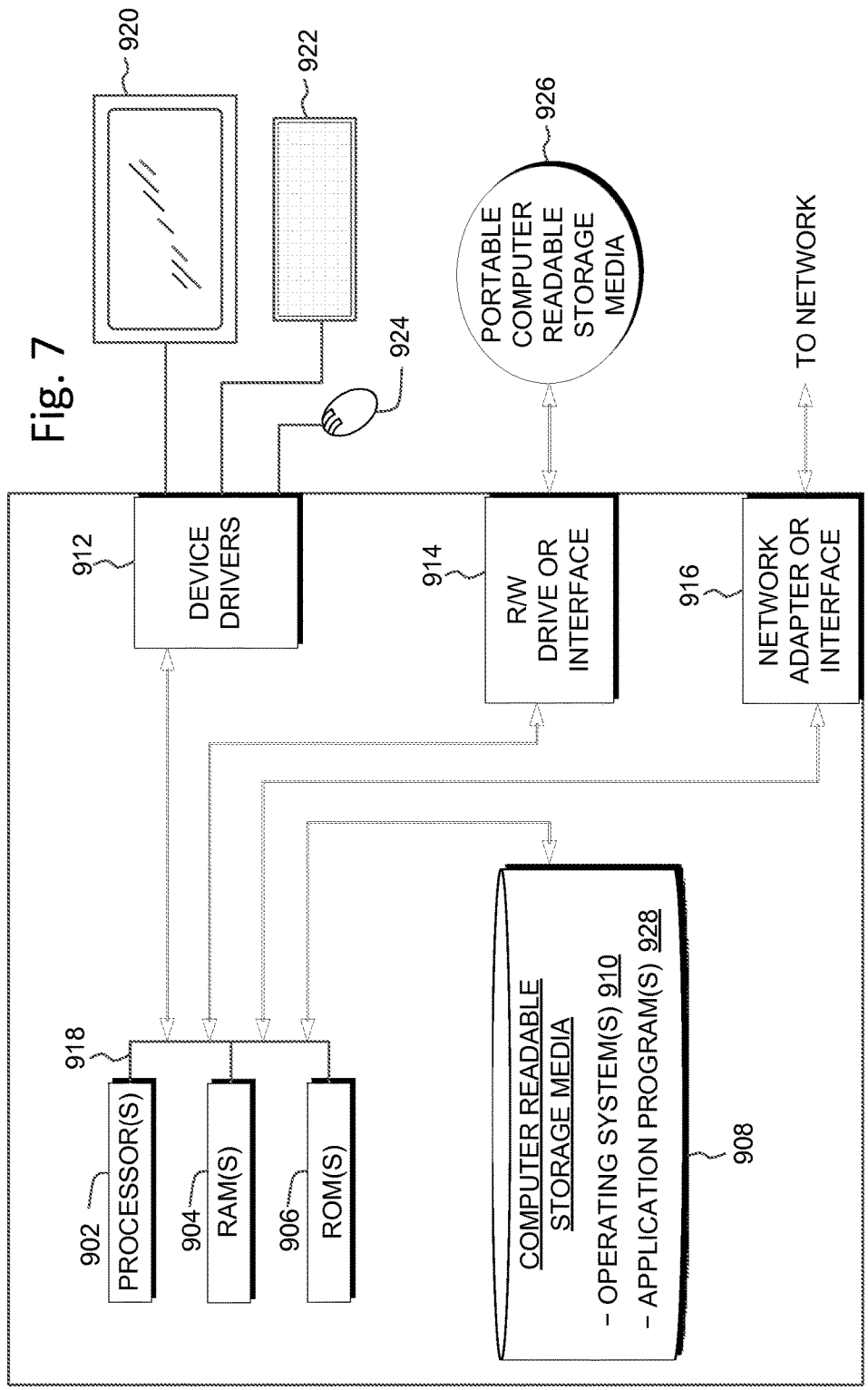
FIG. 7 is a block diagram of components of a computing device of the secure communication systems of FIG. 1, in accordance with an embodiment of the invention.

FIG. 7 depicts a block diagram of components of either user computing device 110 or servers 130, 140 and 150 of live events attendance smart transportation and planning system 100 of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

User computing devices 110 and/or servers 130, 140 and 150 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, event service provider 152 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing device 110 and/or servers 130, 140 and 150 may also include a R/W drive or interface 914 to read from and write to one or more portable computer readable storage media 926. Application programs 928, for example, like the event service 152, on user computing device 110 and/or servers 130, 140 and 150 may be stored on one or more of the portable computer readable storage media 926, read via the respective R/W drive or interface 914 and loaded into the respective computer readable storage media 908.

User computing device 110 and/or servers 130, 140 and 150 may also include a network adapter or interface 916, such as a TCP/IP adapter card or wireless communication adapter (such as a 4G wireless communication adapter using OFDMA technology). Application programs 928 on user computing device 110 and/or servers 130, 140 and 150 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing device 110 and/or servers 130, 140 and 150 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
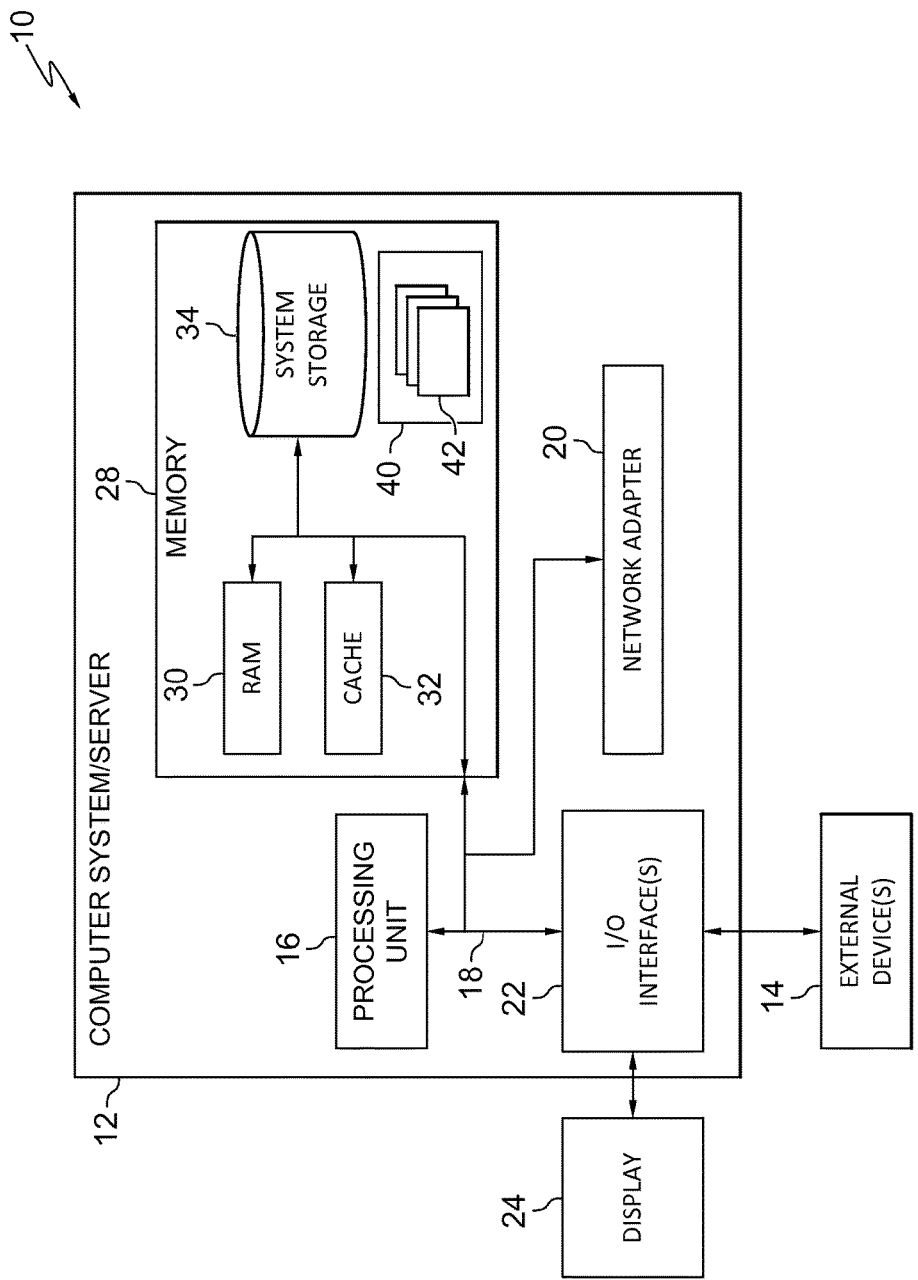
FIG. 8 is a functional block diagram of a cloud computing node according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and live events attendance smart transportation and planning 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer-implemented method for coordinating group attendance to an event, the method comprising:
   retrieving, by a computer, a social media profile and a corresponding social media friends list of a user from at least one social media provider;
   generating and transmitting to a computing device of the user, by the computer, an event recommendation list of at least one event for which at least one friend from the social media friends list has obtained an admissions ticket;
   receiving, by the computer, confirmation of the user obtaining a ticket to the at least one event of the listed events from a ticket service provider;
   receiving, by the computer, a user transportation preference to attend the at least one event;
   retrieving, by the computer, a transportation preference for the at least one friend from the social media friends list who obtained the admissions ticket to the at least one event, wherein the received user transportation preference is to travel to the event on a party bus;
   forming, by the computer, a social media group composed of the user and the at least one friend from the social media friends list that has the transportation preference to travel to the event on the party bus;
   determining, by the computer, a general geographical location for each person in the social media group;
   combining, by the computer, the social media group and at least one other social media group to form the party bus group, wherein the other social media group is composed of users that have a travel preference of using the party bus, wherein the combined group of the social media group and the at least one other social media group is centered around the general geographical location;
   reserving, by the computer, the party bus with a party bus service provider; and
   transmitting, by the computer, the transportation recommendation to the user and the at least one friend from the social media friends list, wherein the transmitting of the transportation recommendation comprises transmitting a rideshare list composed of the combined group of the social media group and the at least one other social media group and the name of a party bus service provider, and the reservation for the party bus.

2. A computer program product for a group to attend an event, the computer program product comprising:
   one or more non-transitory computer-readable storage media and program instructions stored on the one or more non-transitory computer-readable storage media, the program instructions comprising:
   retrieving a social media profile and a corresponding social media friends list of a user from at least one social media provider;
   generating and transmitting to a computing device of the user an event recommendation list of at least one event for which at least one friend from the social media friends list has obtained an admissions ticket;
   receiving confirmation of the user obtaining a ticket to the at least one event of the listed events from a ticket service provider;
   receiving a user transportation preference to attend the at least one event;
   retrieving a transportation preference for the at least one friend from the social media friends list who obtained the admissions ticket to the at least one event, wherein the received user transportation preference is to travel to the event on a party bus;
   forming a social media group composed of the user and the at least one friend from the social media friends list that has the transportation preference to travel to the event on the party bus;
   determining a general geographical location for each person in the social media group;
   combining the social media group and at least one other social media group to form the party bus group, wherein the other social media group is composed of users that have a travel preference of using the party bus, wherein the combined group of the social media group and the at least one other social media group is centered around the general geographical location;
   reserving the party bus with a party bus service provider; and transmitting the transportation recommendation to the user and the at least one friend from the social media friends list, wherein the transmitting of the transportation recommendation comprises transmitting a rideshare list composed of the combined group of the social media group and the at least one other social media group and the name of a party bus service provider, and the reservation for the party bus.

3. A computer system for coordinating group attendance to an event, the computer system comprising:

one or more computer processors, one or more non-transitory computer-readable storage media, and program instructions stored on one or more of the computer-readable storage media for execution by at least one of the one or more processors, the program instructions comprising:

retrieving a social media profile and a corresponding social media friends list of a user from at least one social media provider;

generating and transmitting to a computing device of the user an event recommendation list of at least one event for which at least one friend from the social media friends list has obtained an admissions ticket;

receiving confirmation of the user obtaining a ticket to the at least one event of the listed events from a ticket service provider;

receiving a user transportation preference to attend the at least one event;

retrieving a transportation preference for the at least one friend from the social media friends list who obtained the admissions ticket to the at least one event, wherein the received user transportation preference is to travel to the event on a party bus;

forming a social media group composed of the user and the at least one friend from the social media friends list that has the transportation preference to travel to the event on the party bus;

determining a general geographical location for each person in the social media group;

combining the social media group and at least one other social media group to form the party bus group, wherein the other social media group is composed of users that have a travel preference of using the party bus, wherein the combined group of the social media group and the at least one other social media group is centered around the general geographical location;

reserving the party bus with a party bus service provider; and transmitting the transportation recommendation to the user and the at least one friend from the social media friends list, wherein the transmitting of the transportation recommendation comprises transmitting a rideshare list composed of the combined group of the social media group and the at least one other social media group and the name of a party bus service provider, and the reservation for the party bus.

* * * * *